United States Patent
Qian

(10) Patent No.: US 10,007,781 B2
(45) Date of Patent: **\*Jun. 26, 2018**

(54) METHOD AND SYSTEM FOR PASSWORD SETTING AND AUTHENTICATION

(71) Applicant: ALIBABA GROUP HOLDING LIMITED, George Town, Grand Cayman (KY)

(72) Inventor: Jianbo Qian, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/495,939

(22) Filed: Apr. 24, 2017

(65) Prior Publication Data

US 2017/0228534 A1 Aug. 10, 2017

Related U.S. Application Data

(63) Continuation of application No. 14/729,913, filed on Jun. 3, 2015, now Pat. No. 9,641,518.

(30) Foreign Application Priority Data

Jul. 18, 2014 (CN) .......................... 2014 1 0344946

(51) Int. Cl.
G06F 21/46 (2013.01)
H04L 29/06 (2006.01)

(52) U.S. Cl.
CPC .............. *G06F 21/46* (2013.01); *H04L 63/06* (2013.01); *H04L 63/083* (2013.01)

(58) Field of Classification Search
CPC ............................... H04L 63/083; G06F 21/46
See application file for complete search history.

(56) References Cited

U.S. PATENT DOCUMENTS 4,805,222 A 2/1989 Young et al.
6,954,862 B2 10/2005 Serpa
(Continued)

FOREIGN PATENT DOCUMENTS

CN 1 02509044 A 6/2012
EP 1469372 A2 10/2004
WO WO 2008/010003 A1 1/2008

OTHER PUBLICATIONS

Araujo et al., "User Authentication Through Typing Biometrics Features," IEEE Transaction on Signal Processing, Vo. 53, No. 2, Feb. 2005 (5 pages).
(Continued)

*Primary Examiner* — Oleg Korsak
(74) *Attorney, Agent, or Firm* — Finnegan, Henderson, Farabow, Garrett & Dunner LLP

(57) ABSTRACT

A method for password setting and authentication is provided. The method includes receiving a password setting request and acquiring a reference character string and reference input duration information. The reference input duration information may be associated with a character at a position of the reference character string. The method may further include storing the reference character string and the reference input duration information, receiving a password authentication request, and acquiring an authentication character string input by a user and authentication input duration information. The authentication input duration information may be associated with a character at the position of the authentication character string. The method may further include determining whether password authentication is successful based on the authentication character string, the authentication input duration information, the reference character string, and the reference input duration information.

11 Claims, 11 Drawing Sheets

(56) References Cited

U.S. PATENT DOCUMENTS

| | | |
|---|---|---|
| 8,132,018 B2 | 3/2012 | Eldar et al. |
| 8,984,606 B2 | 3/2015 | Kamat |
| 9,015,485 B1 | 4/2015 | Johansson et al. |
| 2004/0143767 A1 | 7/2004 | Schreiber et al. |
| 2006/0059360 A1 | 3/2006 | Ortkiese |
| 2009/0278807 A1 | 11/2009 | Hu |
| 2012/0272288 A1 | 10/2012 | Ashbrook et al. |
| 2013/0086666 A1 | 4/2013 | Cheng et al. |
| 2013/0347101 A1 | 12/2013 | Wu |
| 2014/0007226 A1 | 1/2014 | Inoue |
| 2014/0115341 A1 | 4/2014 | Robertson |

OTHER PUBLICATIONS

Campisi et al., "User authentication using keystroke dynamics for cellular phones", IET Signal Process., 2009, vol. 3, Iss. 4, (9 pages).
PCT International Search Report and Written Opinion dated Aug. 21, 2015, issued in corresponding International Application No. PCT/US2015/034017 (14 pages).

METHOD AND SYSTEM FOR PASSWORD SETTING AND AUTHENTICATION

CROSS-REFERENCE TO RELATED APPLICATION

This application is a continuation of Ser. No. 14/729,913 filed Jun. 3, 2015, which is based upon and claims priority to Chinese Patent Application No. 201410344946.X, filed on Jul. 18, 2014, both of which are incorporated herein by reference in their entirities.

TECHNICAL FIELD

The present disclosure generally relates to the field of information security technologies and, more particularly, to a method and system for password setting and authentication.

BACKGROUND

In daily life, information security of individuals, enterprises, and other objects is often ensured by setting passwords. For example, power-on passwords are set for devices such as personal computers (PC) and smart phones, and login passwords are set for accounts such as an online bank account and a social network account. After a password is set, password authentication needs to be performed before any user uses a related device or logs on to a website by using a related account. When information input by the user matches the preset password, a permission to use the related device or to log on to the website using the related account may be granted.

A conventional password authentication method includes acquiring an authentication password input by a user and comparing the input authentication password with a preset password. If the number of characters in the authentication password is the same as the number of characters in the preset password, and character values in the authentication password are the same as those at the same positions in the preset password, it may be determined that the input authentication password is the same as the preset password, and that the password authentication is successful.

Since the conventional password authentication method is based on the number of characters and character values, the preset password can be cracked by means of exhaustion. For example, a number of character strings of different lengths with different characters may be generated through a manual operation or by a corresponding automatic program and be used as authentication passwords for password authentication. As a result, a character string that successfully passes the authentication may be identified as the preset password.

SUMMARY

The present disclosure provides a method for password setting and authentication. Consistent with some embodiments, the method includes receiving a password setting request and acquiring a reference character string and reference input duration information. The reference input duration information may be associated with a character at a position of the reference character string. The method may further include storing the reference character string and the reference input duration information, receiving a password authentication request, and acquiring an authentication character string input by a user and authentication input duration information. The authentication input duration information may be associated with a character at the position of the authentication character string. The method may further include determining whether password authentication is successful based on the authentication character string, the authentication input duration information, the reference character string, and the reference input duration information.

Consistent with some embodiments, this disclosure provides a password setting and authentication system. The password setting and authentication system includes a first acquiring unit configured to receive a password setting request and acquire a reference character string input by a user and reference input duration information. The reference input duration information may be associated with a character at a position of the reference character string. The password setting and authentication system may further include a password storage unit configured to store the reference character string and the reference input duration information. The password setting and authentication system may further include a second acquiring unit configured to receive a password authentication request and acquire an authentication character string input by a user and authentication input duration information. The authentication input duration information may be associated with a character at the position of the authentication character string. The password setting and authentication system may further include an authentication unit configured to determine whether password authentication is successful based on the authentication character string, the authentication input duration information, the reference character string, and the reference input duration information.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
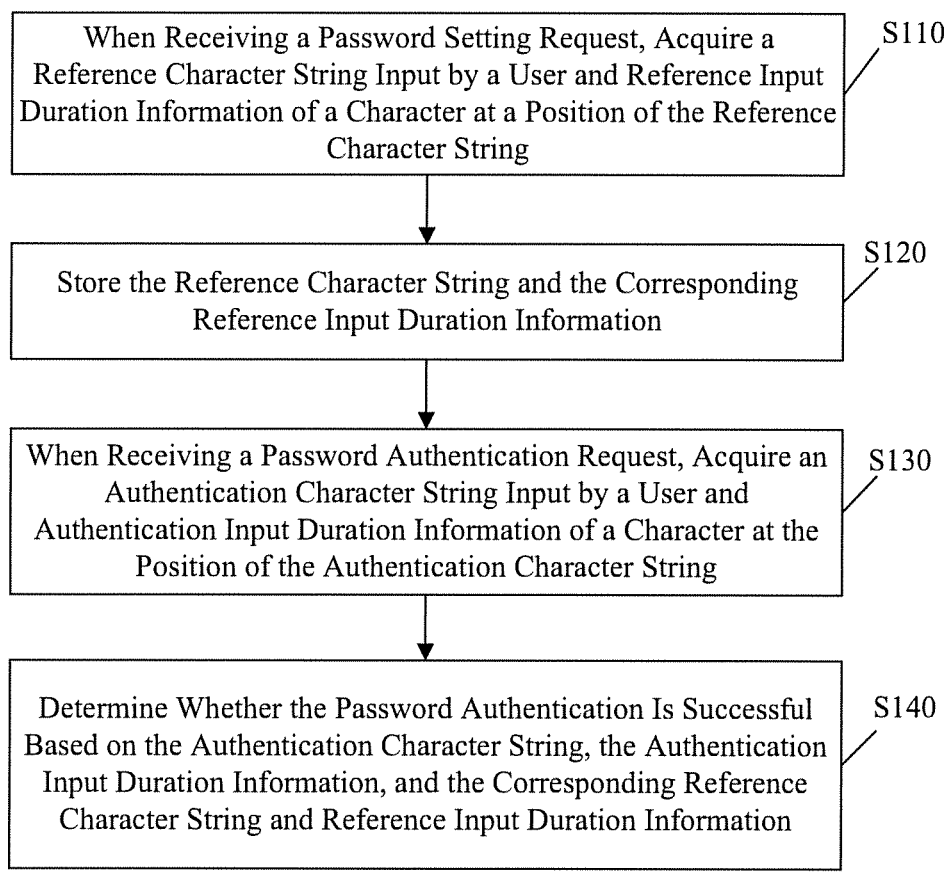
FIG. 1 is a flowchart of an exemplary method for password setting and authentication, consistent with some embodiments of this disclosure.

FIG. 1 is a flowchart of an exemplary method 100 for password setting and authentication, consistent with some embodiments of this disclosure. The method 100 may be performed by a password setting and authentication system. Referring to FIG. 1, the exemplary method 100 includes the following steps.

In step S110, when receiving a password setting request, the system acquires a reference character string input by a user and reference input duration information of a character at a position of the reference character string. In the stage of password setting, the system acquires not only the character string input by the user, but also the input duration information generated when the character at a position of the character string is input. In some embodiments, the position of the character may be a preset position set by the system or by the user before the user inputs the reference character string.

Figure 2:
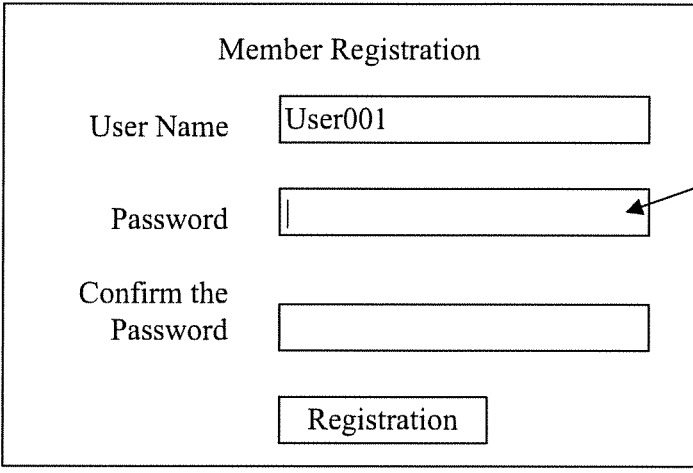
FIG. 2 is a schematic diagram of a display interface, consistent with some embodiments of this disclosure.

FIG. 2 is a schematic diagram of a display interface 200, consistent with some embodiments of this disclosure. For example, when the user registers as a member of a website, in addition to setting a user name, the user also needs to set a corresponding password, and the position is the first position of the character string. As shown in FIG. 2, in a member registration display interface displayed on the client device, when the cursor moves to a password input area 201, the client device generates a password setting request. When receiving the password setting request, a processing unit controls the client device to receive characters input by the user in the password input area 201 to obtain the reference character string. Moreover, while receiving the first character of the reference character string, the system acquires information about the time duration it takes for the user to input the first character, that is, the reference input duration information. It should be understood that the first character is used for illustration in this example, and the reference input duration information may be associated with a character at any position of the reference character string.

In this embodiment, the reference character string input by the user and the corresponding reference input duration information may be acquired by a device such as an input keyboard connected to a PC, a touch screen of a smart phone, a touch screen of a tablet computer, or the like.

Referring to FIG. 1, in step S120, the system stores the reference character string and the corresponding reference input duration information.

In this embodiment, a reference password includes a combination of the reference character string and the corresponding reference input duration information. For example, if the acquired reference character string is "password", and the reference input duration information is 3 seconds (i.e., duration that it takes to input the character at the position of the reference character string, such as first character "p"), the system may store the "password" and "3" in two corresponding storage units. Alternatively, the system may combine the "password" and "3" into one character string, such as "password3" or "3password", and store it in a storage unit.

The reference character string and the corresponding reference input duration information may be stored in a corresponding device, such as a server or a terminal device. In some embodiments, the device may store multiple reference character strings and corresponding reference input duration information. When the password authentication process is performed, the device may search for the reference password that serves as an authentication criterion based on information such as a user name.

In step S130, when receiving a password authentication request, the system acquires an authentication character string input by a user and authentication input duration information of a character at the position of the authentication character string.

For example, when a user logs on to the website, in addition to inputting a user name, the user further needs to input a corresponding password, that is, the authentication password. Similar to step S110, when receiving the password authentication request, a processing unit controls the client device to receive characters input by the user, thereby obtaining the authentication character string. While receiving the first character of the authentication character string, the system also acquires information about the time duration it takes to input a character at the position of the authentication character string, e.g., the first character.

In step S140, the system determines whether the password authentication is successful based on the authentication character string, the authentication input duration information, and the corresponding reference character string and reference input duration information.

If the following two sub-conditions are met, i.e., the authentication character string is the same as the reference character string, and the authentication input duration information is the same as the reference input duration information, the system may determine that the password authentication is successful. Otherwise, if either of the sub-conditions is not met or both the sub-conditions are not met, the system may determine that the password authentication fails.

In the method 100, to achieve successful password authentication, the user not only needs to ensure that the characters and the number of the characters in the input authentication character string are the same as those in the reference character string input in the stage of password setting, but also needs to ensure that the input duration information of the character at the position is the same as the reference input duration information generated in the stage of password setting. Therefore, the method 100 reduces the chance of password cracking and enhances the security of the password when an attempt is made to crack the reference password by means of exhaustion. Moreover, the method 100 is user friendly as it does not require increasing the length of the password or adding a verification code in the password authentication process.

In some embodiments, the position of the character string may be set based on actual application requirements. For example, the position may be one position in the character string (such as the first position of the character string). As another example, the position may include multiple positions in the character string.

When multiple positions are set, the system needs to determine that, for each position, if corresponding reference input duration information and authentication input duration information are the same. For example, when the positions are the first position and the second position of the character string, in addition to determining if authentication input duration information corresponding to the first character of the authentication character string is the same as reference input duration information corresponding to the first character of the reference character string, it is also necessary to determine if authentication input duration information corresponding to the second character of the authentication character string is the same as the reference input duration information corresponding to the second character of the reference character string. The system may determine that the authentication input duration information in the current authentication process is the same as the preset reference input duration information when the authentication input duration information matches the corresponding reference input duration information for both positions. By including more positions, it is more difficult to crack the reference password by means of exhaustion, and thus, the password is more secure.

In some embodiments, the reference input duration information and the authentication input duration information (which are collectively referred to as input duration information below) may be an input time it takes to input a character at a position of a corresponding character string, for example, a holding time during which a corresponding key signal is in a triggered state. The input duration information may also be an identifier corresponding to the input time. For example, input times may be differentiated by using different attributes associated with the identifiers, such as different identifier patterns or different numbers of identifiers.

In some embodiments, in setting password of some client devices or stand-alone software, for example, setting of an on/off password or unlocking password of a PC or a terminal device, the input duration information may be counted starting from the moment when a user presses a corresponding key of an external keyboard so that the key sends a communication signal, till the moment when the user releases the corresponding key of the external keyboard so that the key stops sending the communication signal. In some embodiments, the input duration information may also be counted starting from the moment when a user touches a corresponding position of a touch screen of a terminal device, till the moment when the user stops touching the corresponding position of the touch screen of the terminal device.

In setting password of some network devices or network application software, a client device often needs to transmit data information to a server through a network, and the process of transmitting the data information takes a certain period of time. In this scenario, the duration of the process of transmitting data through the network may be excluded when the input duration information is determined. Alternatively, the client device may first acquire the input duration information, and then transmit the input duration information to the network server.

Figure 3:
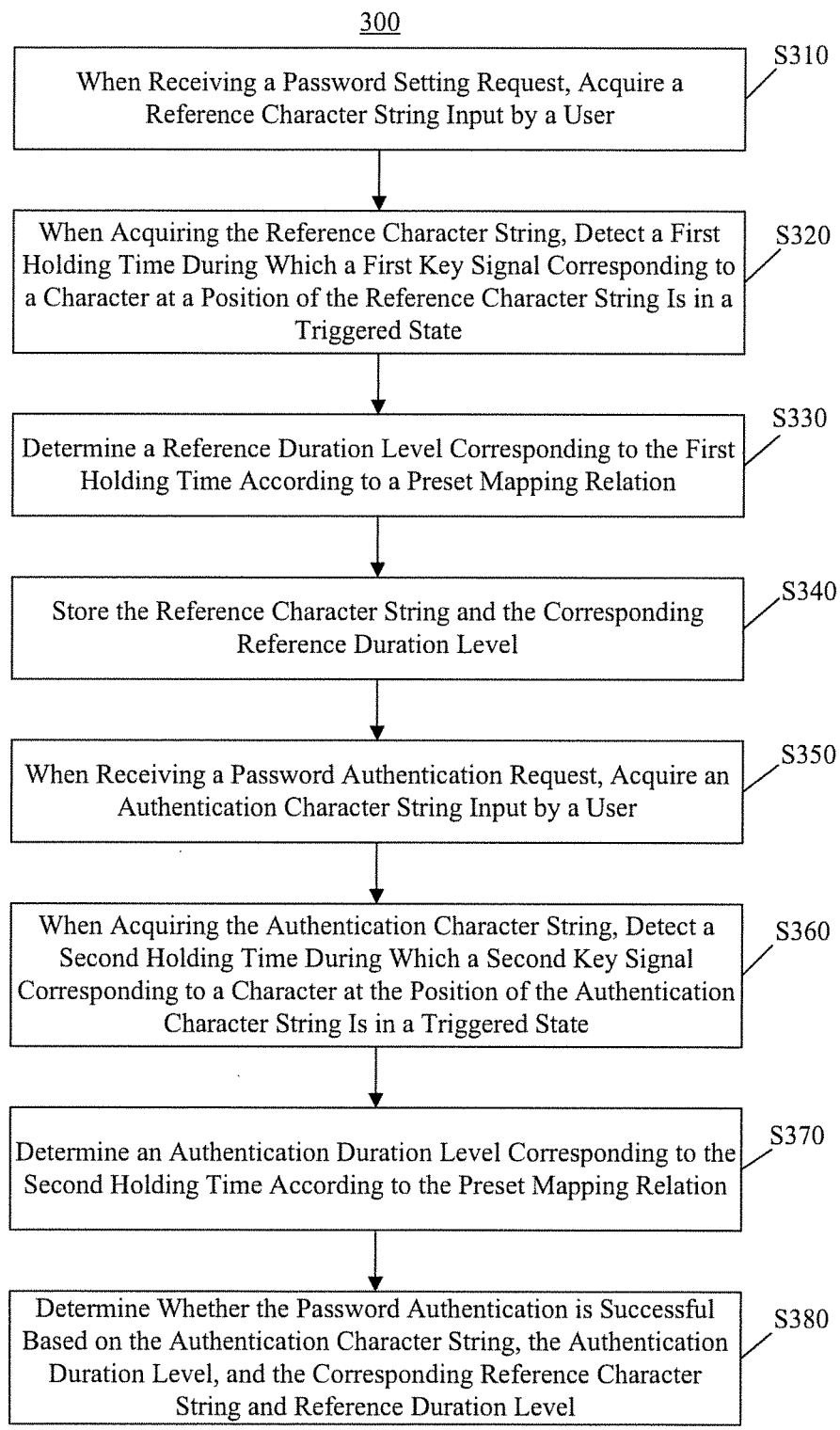
FIG. 3 is a flowchart of another exemplary method for password setting and authentication, consistent with some embodiments of this disclosure.

FIG. 3 is a flowchart of another exemplary method 300 for password setting and authentication, consistent with some embodiments of this disclosure. In the method 300, an identifier is used to represent the input duration information, the reference input duration information is represented by a reference duration level, and the authentication input duration information is represented by an authentication duration level. The method 300 may be performed by a password setting and authentication system. Referring to FIG. 3, the method 300 includes the following steps.

In step S310, when receiving a password setting request, the system acquires a reference character string input by a user.

In step S320, when acquiring the reference character string, the system detects a first holding time during which a first key signal corresponding to a character at a position of the reference character string is in a triggered state. In some embodiments, the position may be a preset position set by the system or by the user before the user inputs the reference character string.

For example, a key signal may be triggered when a key of an external keyboard is pressed, or a key signal may be triggered when a touch screen key of a terminal device is touched. When the key of the external keyboard is released, the triggering of the key signal may be stopped, or when the touch screen key of the terminal device is no longer being touched, the triggering of the key signal may be stopped.

When the key signal is in the triggered state, it indicates that the corresponding physical key is being pressed, or the corresponding virtual key is being touched. The status of the key signal further includes a to-be-triggered state. When the key signal is in the to-be-triggered state, it indicates that the corresponding physical key is not being pressed, or the corresponding virtual key is not being touched. The input duration information represents a time interval between the moment when the key signal switches from the to-be-triggered state to the triggered state and the moment when the key signal switches from the triggered state to the to-be-triggered state. This time interval represents a holding time during which the key signal is in the triggered state.

In step S330, the system determines a reference duration level corresponding to the first holding time according to a preset mapping relation.

The mapping relation between the holding time and the duration level may be set in advance. For example, the mapping relation may be set according to Table 1 below:

TABLE 1

Preset mapping relation between holding time and duration level

| | Holding time | | | |
|---|---|---|---|---|
| | 1 to 3 seconds | 4 to 6 seconds | 7 to 9 seconds | ... |
| Duration level | A | B | C | ... |

According to Table 1, when the holding time is 1 second, 2 seconds, or 3 seconds, the corresponding duration level is level A; when the holding time is 4 seconds, 5 seconds, or 6 seconds, the corresponding duration level is level B, and the rest may be deduced by analogy. If the input duration needs to meet a higher precision requirement, the time span covered by each level may be reduced properly. For example, it may be set that the corresponding duration level is level A only when the holding time is 1 second or 2 seconds, and the holding time of 3 seconds corresponds to the next level B. The security of the password may be enhanced by reducing the time span in each duration level. On the other hand, if a lower precision is desired in the input duration, the time span covered by each level may be increased properly. For example, it may be set that when the holding time is 1 second, 2 seconds, 3 seconds, or 4 seconds, the corresponding duration level is level A. Correspondingly, the security of the password is lowered.

The duration level in this embodiment may be expressed in other forms without departing from the scope and the spirit of the present disclosure. For example, in addition to the letters A, B, C, and the like as described above, the duration level may also be expressed in the form of numbers such as 1, 2, 3, and the like, or in the form of other characters, which are not described in detail herein.

In step S340, the system stores the reference character string and the corresponding reference duration level.

In some embodiments, the reference character string and the reference duration level may be combined according to a preset combining rule, to obtain a reference password, and the reference password may be stored in a server or a terminal device. For example, if the reference character string input by the user is "pass", and the corresponding reference duration level is A, "pass" and level A may be combined according to a preset combining rule of "character string+duration level", and the resulting reference password is "passA". As another example, "pass" and level A may also be combined according to a preset combining rule of "duration level+character string", and the resulting reference password is "Apass".

In other embodiments, the reference character string and the corresponding reference duration level may be separately stored in two associated storage units in a server or a terminal device instead of being combined.

In step S350, when receiving a password authentication request, the system acquires an authentication character string input by a user.

In step S360, when acquiring the authentication character string, the system detects a second holding time during which a second key signal corresponding to a character at the position of the authentication character string is in a triggered state. As previously described, the position may preset by the system or by the user before the user inputs the reference character string.

In step S370, the system determines an authentication duration level corresponding to the second holding time according to the preset mapping relation.

The same preset mapping relation may be used in the stage of password setting and the stage of password authentication.

In step S380, the system determines whether the password authentication is successful based on the authentication character string, the authentication duration level, and the corresponding reference character string and reference duration level.

In the method 300, a condition for successful password authentication includes the following two sub-conditions: the authentication character string is the same as the corresponding reference character string (i.e., the two character strings have the same number of characters, and have the same characters at the same positions), and the authentication duration level is the same as the corresponding reference duration level.

In some embodiments, after the authentication character string and the authentication duration level are obtained, the system may determine separately if the above two sub-conditions are satisfied. When the above two sub-conditions are both satisfied, the system may determine that the password authentication is successful. Otherwise, when either of the above two sub-conditions is not satisfied or none of the two sub-conditions is satisfied, the system may determine that the password authentication fails.

In other embodiments, after the authentication character string and the authentication duration level are obtained, the authentication character string and the authentication duration level may be combined first according to the preset combining rule described above, to obtain an authentication password, and then, the authentication password, as a whole, is compared with the corresponding reference password. If the authentication password is the same as the corresponding reference password, it indicates that the above two sub-conditions are both satisfied, and therefore, the system may determine that the password authentication is successful. If the authentication password is not the same as the corresponding reference password, it indicates that at least one of the above two sub-conditions is not satisfied, and therefore, the system may determine that the password authentication fails.

Figure 4:
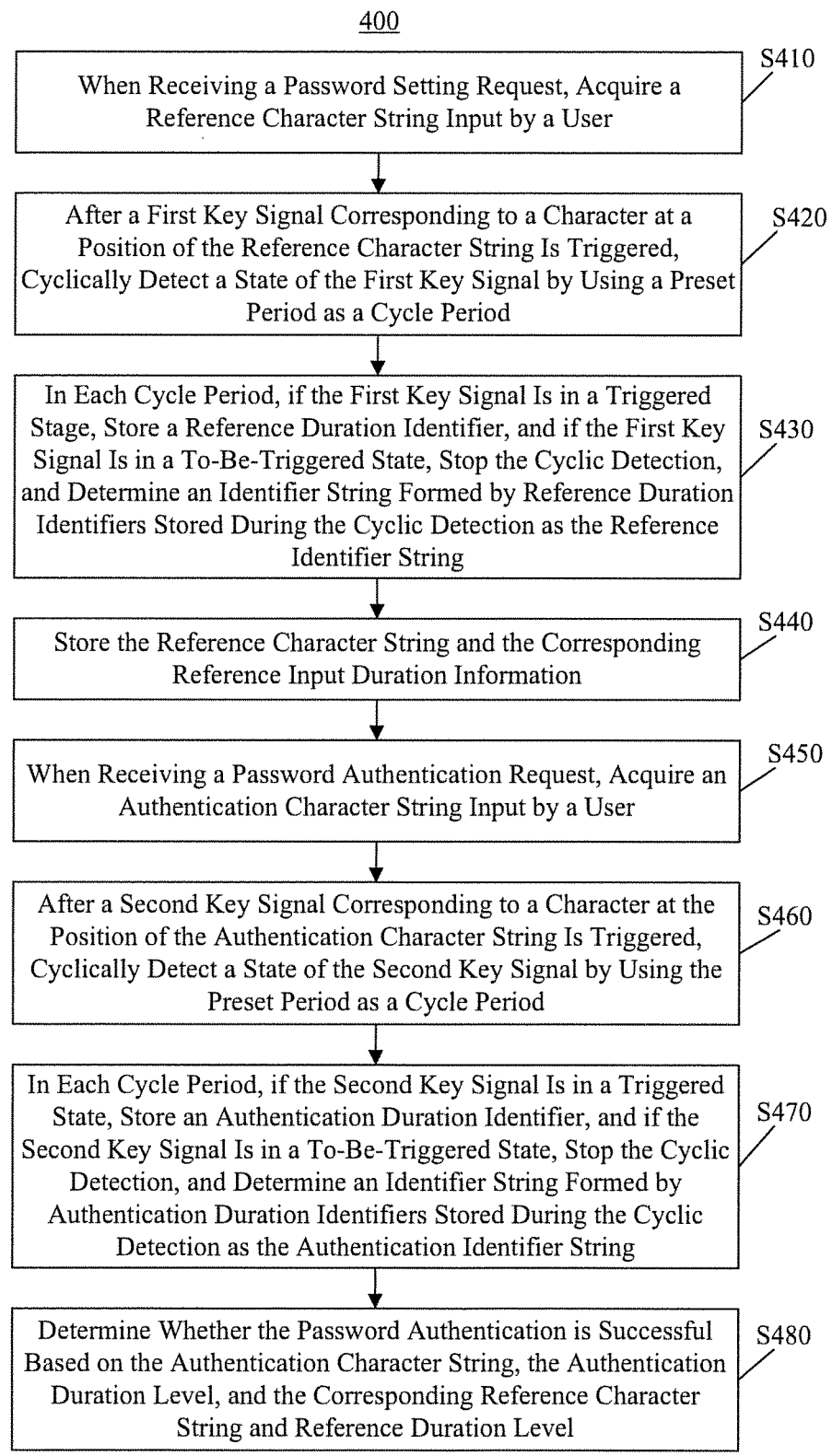
FIG. 4 is a flowchart of still another exemplary method for password setting and authentication, consistent with some embodiments of this disclosure.

FIG. 4 is a flowchart of another exemplary method 400 for password setting and authentication, consistent with some embodiments of this disclosure. In the method 400, an identifier is used to represent the input duration information, the reference input duration information is represented by a reference identifier string, and the authentication input duration information is represented by an authentication identifier string. The method 400 may be performed by a password setting and authentication system. Referring to FIG. 4, the method 400 includes the following steps.

In step S410, when receiving a password setting request, the system acquires a reference character string input by a user.

In step S420, after a first key signal corresponding to a character at a position of the reference character string is triggered, the system cyclically detects the state of the first key signal by using a preset period as a cycle period. In some embodiments, the position may be a preset position set by the system or by the user before the user inputs the reference character string.

In step S430, in each cycle period, if the first key signal is in a triggered state, the system stores a reference duration identifier. If the first key signal is in a to-be-triggered state, the system stops the cyclic detection, and determines an identifier string formed by the reference duration identifiers stored during the cyclic detection as the reference identifier string.

In this embodiment, a product of the number n of reference duration identifiers in the reference identifier string and the cycle period T is equal to an input time t of the character at the position, that is, t=T×n. Therefore, a greater number of reference duration identifiers indicates a longer time during which the first key signal stays in the triggered state, that is, a longer input time of the character at the position of the reference character string.

The reference duration identifier may be a preset fixed character, and may also be a character actually input at the position. For example, when the character actually input at the position is "1", "1" may be used as the reference duration identifier. Assuming that in the first to fourth cycle periods, the first key signal is constantly in the triggered state, and it is detected in the fifth cycle period that the first key signal is in the to-be-triggered state, the reference identifier string obtained in the current cyclic detection process may then be set as "1111".

In step S440, the system stores the reference character string and the corresponding reference input duration information.

In step S450, when receiving a password authentication request, the system acquires an authentication character string input by a user.

In step S460, after a second key signal corresponding to a character at the position of the authentication character string is triggered, the system cyclically detects the state of the second key signal by using the preset period as a cycle period.

In step S470, in each cycle period, if the second key signal is in a triggered state, the system stores an authentication duration identifier. If the second key signal is in a to-be-triggered state, the system stops the cyclic detection, and determines an identifier string formed by the authentication duration identifiers stored during the cyclic detection as the authentication identifier string.

In the method 400, the same preset cycle period is used in the stage of password setting and the stage of password authentication.

In step S480, the system determines whether the password authentication is successful based on the authentication character string, the authentication identifier string, and the corresponding reference character string and reference identifier string.

In the method 400, a condition for successful password authentication includes the following two sub-conditions: the authentication character string is the same as the corresponding reference character string (i.e., the two character strings have the same number of characters, and have the same characters at the same positions), and the authentication identifier string is the same as the corresponding reference identifier string. The system determines that the password authentication is successful when the above two sub-conditions are both satisfied. Otherwise, when either of the above two sub-conditions is not satisfied or none of the two sub-conditions is satisfied, the system determines that the password authentication fails.

In some embodiments, the system may display prompt information corresponding to the reference input duration information when the reference input duration information is acquired. The system may further display prompt information corresponding to the authentication input duration information when the authentication input duration information is acquired.

The prompt information is used for informing a user of current input duration information when the user inputs the character at the position, so that the user may input the password correctly. The step of displaying the corresponding prompt information enables the user to know the set reference input duration information precisely in the stage of password setting. Further, in the stage of password authentication, the user may determine when to end a key pressing or touch operation according to the change of the prompt information, thereby avoiding incorrect input of the password because of incorrect estimation of the actual input duration by the user.

The prompt information may be duration for which the user presses or touches the key corresponding to the character, the duration level described above in connection with FIG. 3, or the number of stored duration identifiers described above in connection with FIG. 4. The prompt information may be displayed in the form of letters, numbers, or graphics.

Figure 5:
FIG. 5 is a schematic diagram of a password input interface, consistent with some embodiments of this disclosure.

FIG. 5 is a schematic diagram of a password input interface 500, consistent with some embodiments of this disclosure. In this example, the position is the first position of the corresponding character string, and the preset mapping relation between the holding time and the duration level is the same as the mapping relation shown in Table 1. The prompt information in FIG. 5 is a duration level expressed in the form of letters.

Referring to FIG. 5, in the stage of password setting, a key corresponding to the first character (using "p" as an example, namely, the first character is p) is pressed or touched, and the key is continuously pressed or touched to stay in the pressed or touched state. When the holding duration reaches 1 second, and the corresponding duration level is level A, the display interface displays prompt information "A", as shown in the upper diagram of FIG. 5. When the holding time reaches 4 seconds, and the corresponding duration level turns to B, the prompt information displayed on the display interface changes from "A" to "B", as shown in the lower diagram of FIG. 5. The displayed prompt information may continue changing until the user stops pressing (or touching) the key "p" and the setting of the duration level of the first character is completed. Assuming that the obtained prompt information at the end of password setting stage is "B", the user may memorize the character "B" as the password input duration level. Subsequently in the stage of password authentication, when the user inputs the first character "p", the user observes the change of the prompt information after pressing (or touching) the key "p" for certain period of time, and can stop pressing (or touching) the key "p" when the prompt information "B" is displayed.

Figure 6:
FIG. 6 is a schematic diagram of another password input interface, consistent with some embodiments of this disclosure.
Figure 6:
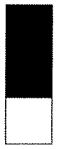

FIG. 6 is a schematic diagram of a password input interface 600, consistent with some embodiments of this disclosure. In this example, the position is the first position of the corresponding character string, and the preset mapping relation between the holding time and the duration level is the same as the mapping relation shown in Table 1. The prompt information in FIG. 6 is the number of duration identifiers expressed in the form of graphics.

Referring to FIG. 6, in the stage of password setting, the key "p" corresponding to the first character is pressed (or touched) and is maintained to be in the pressed (or touched) state. When the holding time reaches 1 second, the first segment of the rectangle in FIG. 6 turns from white to black, as shown in the upper diagram of FIG. 6. When the holding time reaches 4 seconds, the second segment of the rectangle shown in FIG. 6 also turns from white to black, and at this time, both the first segment and the second segment are black, as shown in the lower diagram of FIG. 6. The displayed prompt information may continue changing until the user stops pressing (or touching) the key "p" and the setting of the duration level of the first character is completed. Assuming that the finally obtained prompt information is that only the first segment and second segment in the rectangle are black, the user may memorize the form of graphics with two black segments in the rectangle as the password duration level. Subsequently in the stage of password authentication, when the user inputs the first character "p", the user observes the change of the prompt information after pressing (or touching) the key "p", and can stop pressing (or touching) the key "p" when the first segment and the second segment are both black.

Figure 7:
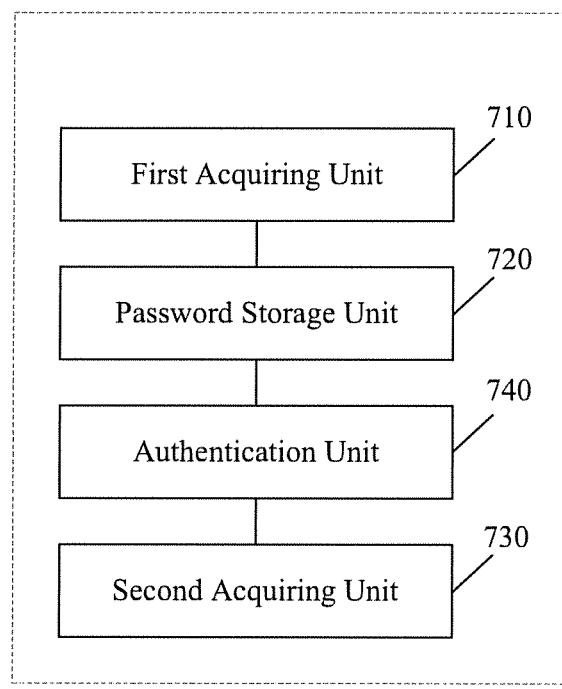
FIG. 7 is a block diagram of an exemplary password setting and authentication system, consistent with some embodiments of this disclosure.

FIG. 7 is a block diagram of an exemplary password setting and authentication system 700, consistent with some embodiments of this disclosure. Referring to FIG. 7, the password setting and authentication system 700 includes a first acquiring unit 710, a password storage unit 720, a second acquiring unit 730, and an authentication unit 740.

The first acquiring unit 710 is configured to when receiving a password setting request, acquire a reference character string input by a user and reference input duration information of a character at a position of the reference character string. In some embodiments, the position of the character may be a preset position set by the system or by the user before the user inputs the reference character string.

The password storage unit 720 is configured to store the reference character string and the corresponding reference input duration information.

The second acquiring unit 730 is configured to when receiving a password authentication request, acquire an authentication character string input by a user and authentication input duration information of a character at the position of the authentication character string.

The authentication unit 740 is configured to determine whether the password authentication is successful based on the authentication character string, the authentication input duration information, the corresponding reference character string, and reference input duration information.

In the password setting and authentication system 700, the password storage unit 720 may store a combination of the reference character string and the corresponding reference input duration information acquired by the first acquiring unit 710 as an authentication criterion for the password authentication. Correspondingly, the authentication unit 740 may use a combination of the authentication character string and the authentication input duration information acquired by the second acquiring unit 730 as an authentication password to be authenticated. The condition for successful password authentication includes the following two sub-conditions: the authentication character string is the same as the reference character string, and the authentication input duration information is the same as the reference input duration information. The password authentication is determined as successful only when the above two sub-conditions are both satisfied. Otherwise, if either of the sub-conditions is not satisfied or both the sub-conditions are not satisfied, the authentication unit 740 determines that the password authentication fails.

In this embodiment of the present application, the reference input duration information acquired by the first acquiring unit 710 and the authentication input duration information acquired by the second acquiring unit 720 (which are collectively referred to as input duration information below) may be an input time it takes to input a character at a position of a corresponding character string, for example, a holding time during which a corresponding key signal is in a triggered state. The input duration information may also be an identifier corresponding to the input time, such as different identifier patterns or different numbers of identifiers.

Figure 8:
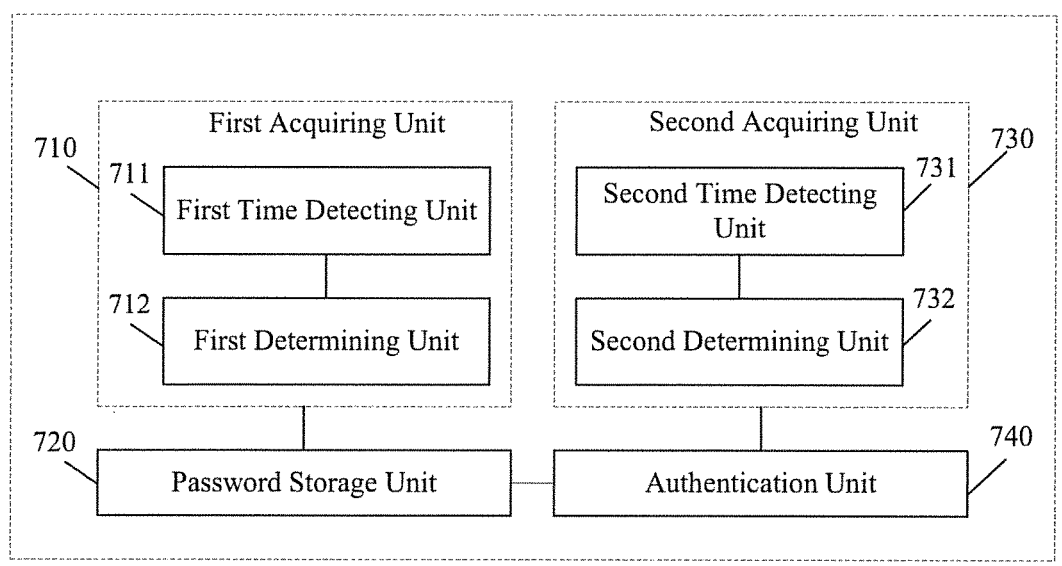
FIG. 8 is a block diagram of another exemplary password setting and authentication system, consistent with some embodiments of this disclosure.

FIG. 8 is a block diagram of another exemplary password setting and authentication system 800, consistent with some embodiments of this disclosure. In password setting and authentication system 800, an identifier is used to represent the input duration information, and the reference input duration information is represented by a reference duration level. Referring to FIG. 8, the password setting and authentication system 800 includes a first acquiring unit 710, a password storage unit 720, a second acquiring unit 730, and an authentication unit 740. As shown in FIG. 8, the first acquiring unit 710 may include a first time detecting unit 711 and a first determining unit 712, and the second acquiring unit 730 may include a second time detecting unit 731 and a second determining unit 732.

The first time detecting unit 711 is configured to detect a first holding time during which a first key signal corresponding to the character at the position of the reference character string is in a triggered state. For example, the position may be preset by the system or by the user before the user inputs the reference character string.

The first determining unit 712 is configured to determine a reference duration level corresponding to the first holding time according to a preset mapping relation.

The second time detecting unit 731 is configured to detect a second holding time during which a second key signal corresponding to the character at the position of the authentication character string is in a triggered state.

The second determining unit 732 is configured to determine an authentication duration level corresponding to the second holding time according to the preset mapping relation.

In the password setting and authentication system 800, the authentication unit 740 determines that the password authentication is successful based on the following two sub-conditions: the authentication character string is the same as the corresponding reference character string (i.e., the two character strings have the same number of characters, and have the same characters at the same positions), and the authentication duration level is the same as the corresponding reference duration level. Otherwise, if either of the sub-conditions is not satisfied, or both the sub-conditions are not satisfied, the authentication unit 740 determines that the password authentication fails.

Figure 9:
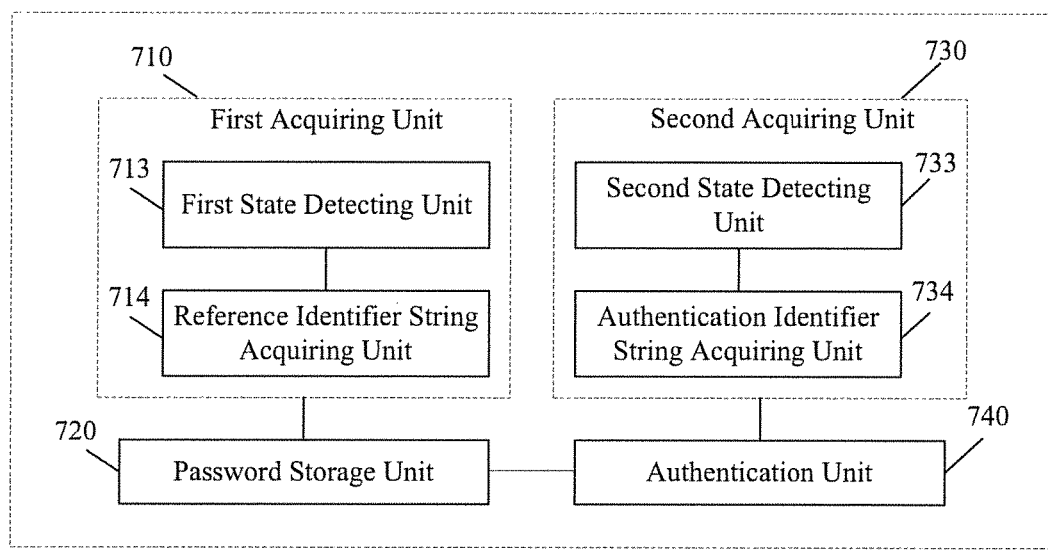
FIG. 9 is a block diagram of still another exemplary password setting and authentication system, consistent with some embodiments of this disclosure.

FIG. 9 is a block diagram of still another exemplary password setting and authentication system 900, consistent with some embodiments of this disclosure. In password setting and authentication system 900, an identifier is used to represent the input duration information, and the reference input duration information is represented by a reference identifier string. Referring to FIG. 9, the password setting and authentication system 900 includes a first acquiring unit 710, a password storage unit 720, a second acquiring unit 730, and an authentication unit 740. As shown in FIG. 9, the first acquiring unit 710 may include a first state detecting unit 713 and a reference identifier string acquiring unit 714, and the second acquiring unit 730 may include a second state detecting unit 733 and an authentication identifier string acquiring unit 734.

The first state detecting unit 713 is configured to cyclically detect the state of the first key signal by using a preset period as a cycle period, after a first key signal corresponding to the character at the position of the reference character string is triggered. In some embodiments, the position may be a preset position set by the system or by a user before the reference character string is input.

The reference identifier string acquiring unit 714 is configured to store a reference duration identifier in each cycle period, if the first key signal is in a triggered state. If the first key signal is in a to-be-triggered state, the reference identifier string acquiring unit 714 is configured to stop the cyclic detection, and determine an identifier string formed by the reference duration identifiers stored during the cyclic detection as the reference identifier string.

The second state detecting unit 733 is configured to cyclically detect the state of the second key signal by using the preset period as a cycle period, after a second key signal corresponding to the character at the position of the authentication character string is triggered.

The authentication identifier string acquiring unit 734 is configured to store an authentication duration identifier in each cycle period, if the second key signal is in a triggered state. If the second key signal is in a to-be-triggered state, the authentication identifier string acquiring unit 734 is configured to stop the cyclic detection, and determine an identifier string formed by the authentication duration identifiers stored during the cyclic detection as the authentication identifier string.

In the password setting and authentication system 900, the authentication unit 740 determines that the password authentication is successful comprises based on the following two sub-conditions: the authentication character string is the same as the corresponding reference character string (i.e., the two character strings have the same number of characters, and have the same characters at the same positions), and the authentication identifier string is the same as the corresponding reference identifier string. That is, the authentication unit 740 determines that the password authentication is successful when the above two sub-conditions are both satisfied. Otherwise, if either of the above two sub-conditions is not satisfied, or none of the sub-conditions is satisfied, the authentication unit 740 determines that the password authentication fails.

Figure 10:
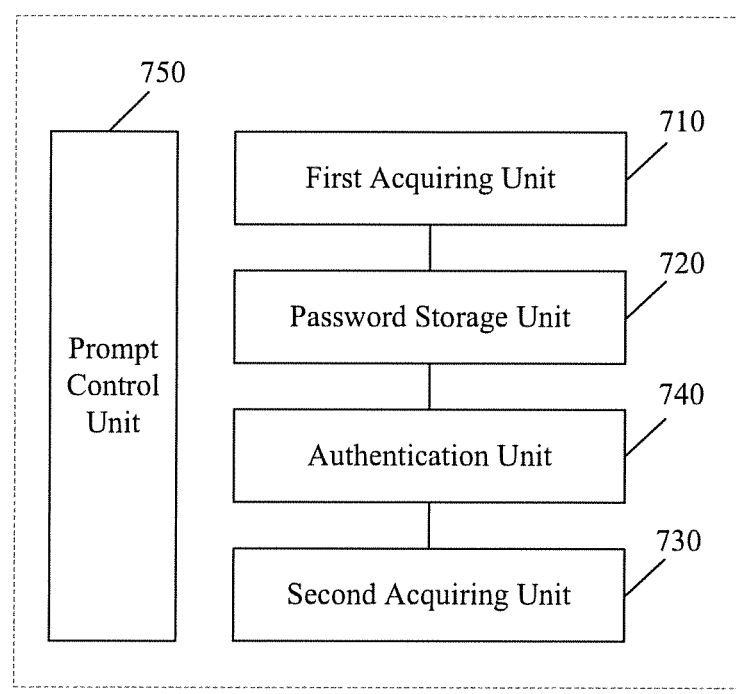
FIG. 10 is a block diagram of still another exemplary system for password setting and authentication, consistent with some embodiments of this disclosure.

FIG. 10 is a block diagram of still another exemplary system for password setting and authentication 1000, consistent with some embodiments of this disclosure. As shown in FIG. 10, the password setting and authentication system 1000 may further include a prompt control unit 750. The prompt control unit 750 is configured to display prompt information corresponding to the reference input duration information when the reference input duration information is acquired in the password setting stage. The prompt control unit 750 is further configured to display prompt information corresponding to the authentication input duration information when the authentication input duration information is acquired in the authentication stage.

The prompt information is used for informing a user of current input duration information when the user inputs the character at the position, so that the user may input the password correctly. By displaying the corresponding prompt information, the password setting and authentication 1000 enables the user to know the set reference input duration information precisely in the stage of password setting. Subsequently in the stage of password authentication, the user may determine when to end a key pressing or touch operation according to the change of the prompt information, thereby avoiding an incorrect input of the password resulting from misestimating the actual input duration.

Figure 11:
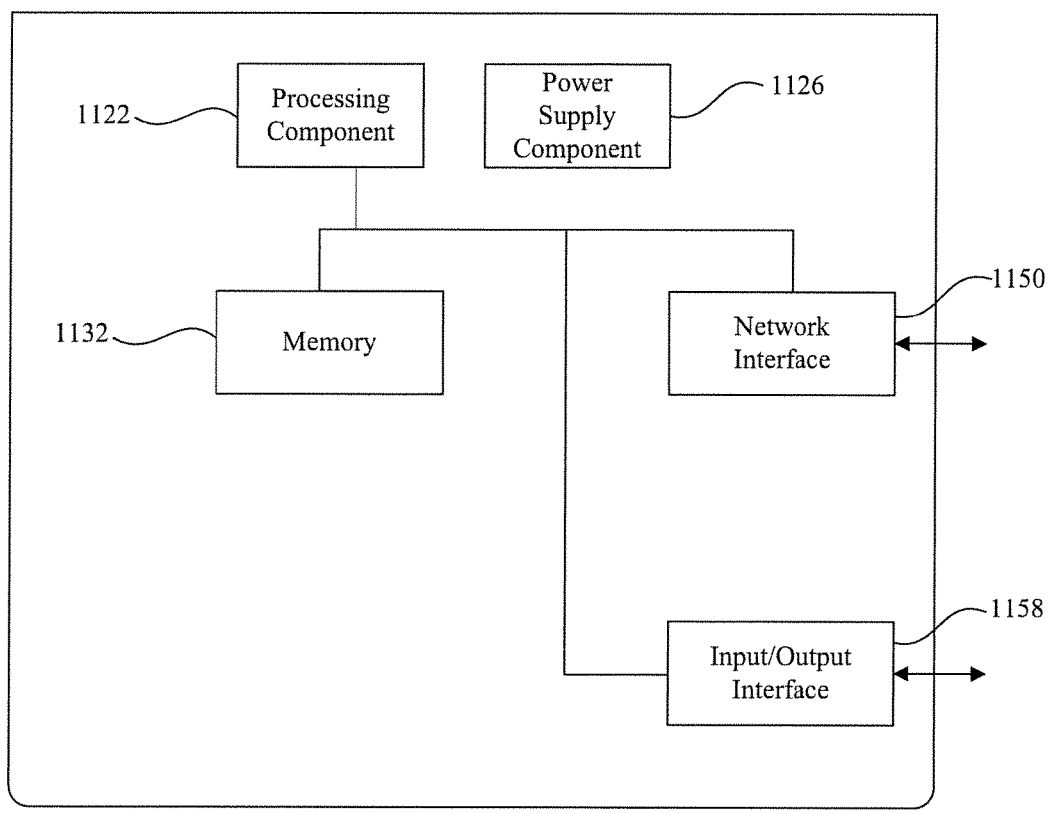
FIG. 11 is a block diagram of an exemplary apparatus for password setting and authentication, consistent with some embodiments of this disclosure.

FIG. 11 is a block diagram of an exemplary apparatus 1100 for password setting and authentication, consistent with some embodiments of this disclosure. The apparatus 1100 may be a server, a PC, a smart phone, a tablet computer, or the like. Referring to FIG. 11, the apparatus 1100 includes a processing component 1122 that further includes one or more processors, and a memory 1132. The memory 1132 is used for storing instructions, such as an application program, that can be executed by the processing component 1122. The application program stored in the memory 1132 may include one or more modules, each of which corresponds to a group of instructions. In addition, the processing component 1122 may be configured to execute instructions for performing the above described methods for password setting and authentication.

The password setting and authentication apparatus 1100 may further include a power supply component 1126 configured to perform power management on the apparatus 1100, a wired or wireless network interface 1150 configured to connect the apparatus 1100 to a network, and an input/output (I/O) interface 1158. The apparatus 1100 may operate based on an operating system stored in the memory 1132, for example, Windows Server, Mac OS X, Unix, Linux, FreeBSD, or the like.

In exemplary embodiments, a non-transitory computer-readable storage medium including instructions is also provided, such as the memory 1132 including instructions, and the instructions may be executed by the processing component 1122 of the apparatus 1100, for performing the above-described methods. For example, the non-transitory computer-readable storage medium may be read-only memory (ROM), random access memory (RAM), CD-ROM, magnetic tape, floppy disk and optical data storage device, etc.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A non-transitory computer readable medium that stores a set of instructions that is executable by at least one processor of a system to cause the system to perform a method for password setting and authentication, the method comprising:

acquiring a reference character string and reference input duration information, wherein the reference input duration information is associated with a character at a position of the reference character string;

storing the reference character string and the reference input duration information, wherein storing the reference character string and the reference input duration information comprises combining the reference character string and the reference input duration information into a reference password according to a preset combining rule, the reference password being a character string different from the reference character string;

acquiring an authentication character string input by a user and authentication input duration information, wherein the authentication input duration information is associated with a character at the position of the authentication character string; and determining whether password authentication is successful based on the authentication character string, the authentication input duration information, the reference character string, and the reference input duration information.

2. The non-transitory computer readable medium of claim 1, wherein the reference input duration information comprises a reference duration level, and wherein the set of instructions that is executable by the at least one processor of the system to cause the system to further perform:

detecting a first time duration during which a first key signal corresponding to the character at the position of the reference character string is in a triggered state; and determining the reference duration level based on the first time duration and a preset mapping relation.

3. The non-transitory computer readable medium of claim 2, wherein the authentication input duration information comprises an authentication duration level, and wherein the set of instructions that is executable by the at least one processor of the system to cause the system to further perform:

detecting a second time duration during which a second key signal corresponding to the character at the position of the authentication character string is in the triggered state; and determining the authentication duration level based on the second time duration and the preset mapping relation.

4. The non-transitory computer readable medium of claim 1, wherein the reference input duration information comprises a reference identifier string, and wherein the set of instructions that is executable by the at least one processor of the system to cause the system to further perform:

after a first key signal corresponding to the character at the position of the reference character string is triggered, cyclically detecting a state of the first key signal based on a cycle period;

during each cycle period, if the first key signal is in a triggered state, storing a reference duration identifier, and if the first key signal is in a to-be-triggered state in the cycle period, stopping the cyclic detection, and determining an identifier string formed by the reference duration identifier stored during the cyclic detection as the reference identifier string.

5. The non-transitory computer readable medium of claim 4, wherein the authentication input duration information comprises an authentication identifier string, and wherein the set of instructions that is executable by the at least one processor of the system to cause the system to further perform:

after a second key signal corresponding to the character at the position of the authentication character string is triggered, cyclically detecting a state of the second key signal based on the cycle period;

during each cycle period, if the second key signal is in the triggered state, storing an authentication duration identifier; and if the second key signal is in the to-be-triggered state, stopping the cyclic detection, and determining an identifier string formed by the authentication duration identifier stored during the cyclic detection as the authentication identifier string.

6. The non-transitory computer readable medium of claim 4, wherein the first key signal is in the triggered state when a key corresponding to the character at the position of the reference character string is pressed or touched, and the first key signal is in the to-be-triggered state when the key corresponding to the character at the position of the reference character string is not being pressed or touched.

7. The non-transitory computer readable medium of claim 1, wherein the set of instructions that is executable by the at least one processor of the system to cause the system to further perform:

determining that the password authentication is successful if the authentication character string matches the reference character string, and the authentication input duration information matches the reference input duration information.

8. The non-transitory computer readable medium of claim 1, wherein the set of instructions that is executable by the at least one processor of the system to cause the system to further perform:

storing the reference password.

9. The non-transitory computer readable medium of claim 1, wherein the reference input duration information is associated with a plurality of characters at a plurality of positions of the reference character string, and the authentication input duration information is associated with a plurality of characters at a plurality of positions of the authentication character string.

10. The non-transitory computer readable medium of claim 1, wherein the set of instructions that is executable by the at least one processor of the system to cause the system to further perform:

displaying prompt information corresponding to the reference input duration information when acquiring the reference input duration information; and displaying prompt information corresponding to the authentication input duration information when acquiring the authentication input duration information.

11. The non-transitory computer readable medium of claim 1, wherein the position is set before the reference input duration information is input by the user.

* * * * *

UNITED STATES PATENT AND TRADEMARK OFFICE
CERTIFICATE OF CORRECTION

PATENT NO. : 10,007,781 B2
APPLICATION NO. : 15/495939
DATED : June 26, 2018
INVENTOR(S) : Jianbo Qian Page 1 of 1

It is certified that error appears in the above-identified patent and that said Letters Patent is hereby corrected as shown below:

On the Title Page

Item (30), in the Foreign Application Priority Data:
"July 18, 2014 (CN).............. 2014 1 0344946"
Should read:
--July 18, 2014 (CN)............. 201410344946.X--

Signed and Sealed this
Eleventh Day of December, 2018

Andrei Iancu
*Director of the United States Patent and Trademark Office*